Sept. 17, 1968 H. K. A. DE LANGE 3,402,257
MAGNETIC RECORDING OF TELEVISON SIGNALS
WITH PRE-RECORDED SYNC SIGNALS
Filed Aug. 18, 1965
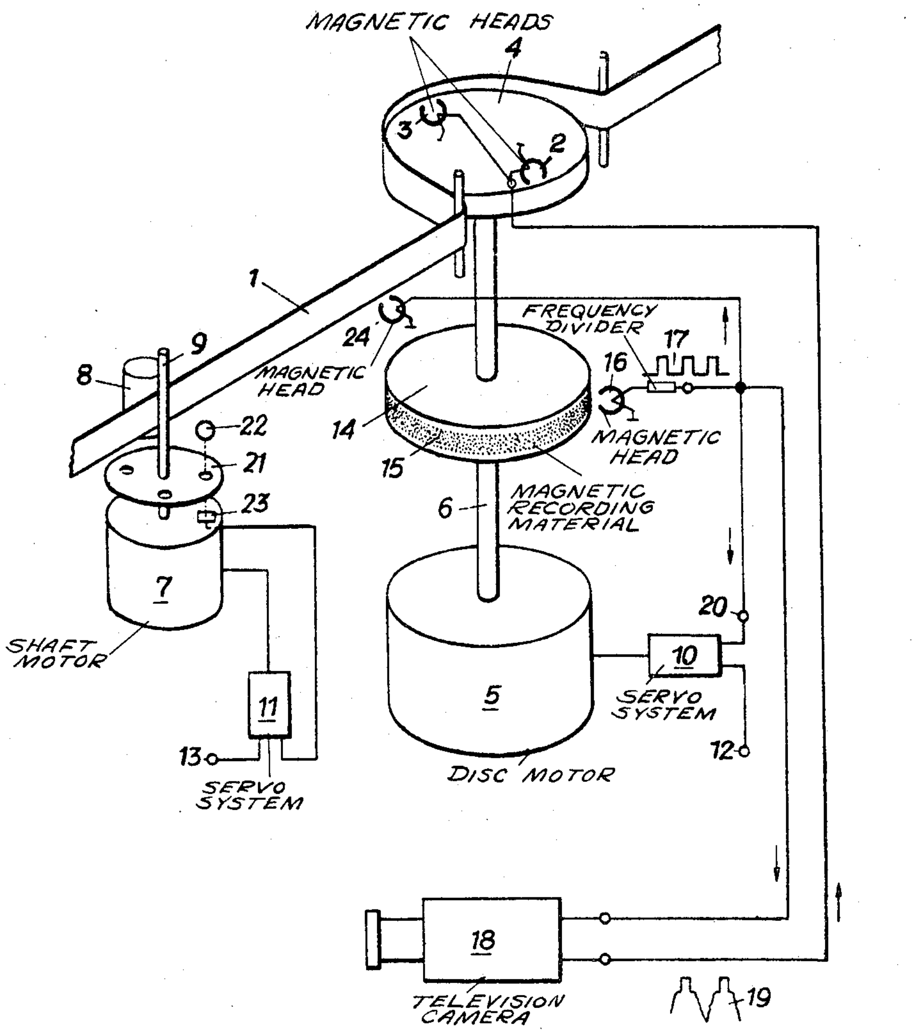
INVENTOR
HERMAN K.A. DE LANGE
BY
Frank R. Trifari
AGENT United States Patent Office 3,402,257

Patented Sept. 17, 1968

3,402,257

MAGNETIC RECORDING OF TELEVISION SIGNALS WITH PRE-RECORDED SYNC SIGNALS

Herman Kasper Adriaan de Lange, Klosterneuburg, Austria, assignor to North American Philips Company, Inc., New York, N.Y., a corporation of Delaware Filed Aug. 18, 1965, Ser. No. 480,684
Claims priority, application Austria, Aug. 19, 1964, A 7,181/64
6 Claims. (Cl. 178—6.6)

ABSTRACT OF THE DISCLOSURE

The invention is an apparatus for producing and recording a television image and synchronization signal on magnetic tape. Pre-recorded synchronization pulses are scanned from a magnetizable layer on a rotatable member, and are used through a servo system to regulate the speed of a motor which drives the rotatable memory and the rotation recording heads. The scanned synchronization pulses are simultaneously recorded on the tape and used to synchronize a free-running television camera.

The invention relates to an apparatus for recording image information as a plurality of image frames, and to apparatus for reproduction of an image. A device according to my invention has at least one rotating member rigidly synchronized with the frame frequency and driven by a motor, which rotating member is provided with marks which are scanned by a scanning device for obtaining synchronizing pulses. The rotating member in such an apparatus may be used, for example, for driving the record carrier. It may also comprise magnetic heads and also be used for obtaining a high relative speed between the slowly moving record carrier and the rotating magnetic head which is often used in the magnetic recording of image information. Since for reproduction in a television receiver the image information must be divided in periods corresponding to the duration of lines and frames, a fixed relation with these periods is required during the recording and reproduction of image information with respect to the recording and scanning speed respectively. To effect this relation, the rotating member is synchronized with a reference frequency, namely the frame frequency, which corresponds to the power supply frequency. This synchronization may be obtained, for example, by driving the rotating member by a synchronous motor or by a motor controlled by means of a servo system.

On account of the fact that such a rotating member which is synchronized with a reference frequency has a constant number of rotations, it is possible to derive from the said member successive pulses having the frame frequency by providing marks on the member which are scanned in suitable manner. Thus, the said pulses are very suitable as synchronization pulses, and are used, for example, for synchronizing a free-running television camera, or as a reference signal for the servo system which drives the rotating member. A diversity of devices is used for marking and scanning, for example, photo-electrically (Nipkow-discs), magnetically or capacitively operating systems.

The invention is based on the recognition of the fact that such an apparatus can also be used in producing a complete television synchronization signal which consists of line and frame synchronization pulses. According to the invention, for obtaining such a television synchronization signal consisting of line and frame synchronization pulses, the rotating member is provided with magnetic marks corresponding to the line and to the frame synchronization pulses. The number of marks is chosen in accordance with the time required for one rotation of the rotating member so that during scanning of the marks a periodic synchronization signal is obtained consisting of line and frame synchronization pulses. The marks are impressed in a magnetizable layer which is provided in known manner on the rotating member and can be scanned by at least one magnetic head.

Such an apparatus has the advantage that it supplies a television synchronization signal consisting of line and frame synchronization pulses. The synchronization signal obtained in this manner may be used for several purposes. It may be used, for example, in reproducing a record with such an apparatus for synchronizing a television receiver.

A free-running television camera can particularly advantageously be synchronized with such a synchronization signal. A camera which is synchronized in this manner is capable of supplying a video signal which already contains the required synchronization pulses, that is to say both lines and frame synchronization pulses. As a result of the measure according to the invention, a separate pulse center for the camera is thus superfluous. In this manner with a simple and inexpensive free-running camera the same results can be obtained as with a complicated entirely synchronized camera.

When the rotating member is driven by a motor controlled by means of a servo system, the synchronization signal which is supplied by the apparatus is advantageously also used for forming the reference signal for the servo system. A separate device for producing the reference signal is thereby saved.

In principle the rotating member may have a plurality of rotational speeds, provided that they meet the synchronization conditions, namely that one rotation is effected in a period, which is a sub-multiple of the frame period. The value of the said multiple is guided by the system used in the respective apparatus, for example, by the number of magnetic heads the rotating member comprises for recording or reproducing or, when the member serves for driving the record carrier, at what speed the said carrier is moved. When the multiple is even, for example, 2, 4 and so on frames are recorded during one rotation of the rotating member, that is to say one complete image, two complete images, and so on. Therefore, the line and frame synchronization pulses of one or more complete images are impressed on the rotating member in the form of marks.

When the above multiple is odd 1 frame, 3 frames and so on are recorded during one rotation of the rotating member. Since, in accordance with the interlacing system a frame also contains each time half a line, this means that in the synchronization signal derived from the rotating member interlacing will occur after every complete revolution which may be annoying during reproduction. So in this case, in which the rotating member has a period for one revolution which corresponds to a frame period or an odd multiple thereof, according to the invention, line and frame synchronization pulses, having a frequency twice as large as the number of frame periods which occur during one revolution of the rotating member, are impressed in the form of magnetic marks in the magnetizable layer. The synchronization signal produced then has the double line frequency, which can be cancelled again in a simple manner by connecting a frequency divider having a division ratio 2:1 to the output of the magnetic head which scans the magnetic layer in which the marks are impressed.

The invention further relates to a method of providing the marks on the rotating member. Since it deals with the provision of a great number of marks, the methods commonly used so far in this technology, for example, the use of Nipkow-discs mirror wheels or gear wheels, can no longer be used because with the use of those methods the required high accuracy with respect to the spacing between marks cannot be achieved. This accuracy, however, is decisive of the quality of an image recorded or to be recorded and of the synchronization signal itself.

The method according to the invention for providing the marks in the magnetizable layer on the rotating member is based on the recognition of the fact that the magnetic marks are recorded according to a known repetition method by means of at least two magnetic heads. Each one of the heads is associated with a recording track. The heads are alternately fed with the synchronization signal formed by the line and frame synchronization pulses. The rotating member is given the required number of revolutions by a servo system in a manner such that the marks once recorded in a track by means of the synchronization signal are scanned from the said track and are also used for forming the reference signal for the servo system. The synchronization signal is simultaneously recorded again in another track, after which the marks recorded in the latter track are scanned and used for synchronizing the servo system. The synchronization signal is recorded in the former track again, and so on, until the desired accuracy of recording the marks is obtained.

In order that the invention may readily be carried into effect, it will now be described in greater detail, by way of example, with reference to the drawing, which diagrammatically shows an embodiment but is not restricted to the said embodiment.

The embodiment shown in the drawing is a magnetic recording and/or reproducing apparatus in which the record carrier 1 is guided in the form of a loop extending over 180° by means not shown (for example, a drum divided into two halves and associated tape guides) and in which inside the said loop the recording of the image information takes place by means of two rotating magnetic heads 2 and 3. The magnetic heads are arranged on a head disc 4 which is driven by a motor 5 through a shaft 6. The transport of the record carrier is effected by means of a driving shaft 9 which is driven by a motor 7 and cooperates with a pressure roller 8.

As already stated in the preamble, the speed of rotation of the rotating member, in this case the rotating disc 14, must be in a given fixed relation to the speed of the record carrier 1 to ensure the required relative speed between the said two elements while this speed must also be entirely constant. For this purpose the motors 5 and 7 can each be controlled by a servo system 10 and 11 respectively. In principle, however, synchronous motors may also be used or even one motor could be sufficient, when, for example, also the driving for the driving shaft 9 is derived from the motor 5 through suitable transmission means. The reference frequency with which the rotating member, i.e. the head disc and/or the driving shaft, is or are synchronized is in this case the mains frequency as well as the frame frequency, so that the number of rotations of these components is absolutely constant. When servo systems are used, the mains voltage is supplied to the inputs 12 and 13 of the said systems as the desired signal. The number of revolutions of the disc 4 in the present system is chosen to be so that during one revolution of the disc, in which two oblique lines are written on the record carrier, two frames, i.e. one complete image, are recorded. This means that in accordance with the image frequency of 25 c./s. the disc has to perform 25 revolutions in one second or 1500 revolutions per minute. The number of revolutions of the driving shaft is chosen corresponding to the desired speed of the record carrier.

A disc 14 is rigidly secured, by means of the shaft 6, to the rotating member, in this case the disc 4, which is driven by the motor 5, and rotates with a constant number of revolutions as described above, so that the said disc 14 rotates with the same number of revolutions as the head disc 4. On the circumference of the disc 14 a magnetizable layer 15 is provided with which a fixed magnetic head 16 cooperates. In accordance with the succession of the line and frame synchronization pulses, magnetic marks are impressed in the said layer. In the recording system to be described the information of two frames and consequently of one complete image is recorded, as explained, during one revolution of the head disc 4 in two tracks extending at an oblique angle over the information carrier. From this it follows that on the circumference of the disc 14 precisely all the synchronization pulses which are associated with a previous image, that is to say with two frames, so the line pulses of two frames and two frame synchronization pulses, must be present in the form of magnetic marks. According to the European television standard, these are thus 625 line pulses impressed on the circumference of the disc, the first line pulse being repeated after the 625th pulse at a distance equal to one line. Of course it is also possible to provide the standardized equalization pulses in the form of marks. In devices upon which not such high requirements are imposed, the frame pulses may also be impressed as standard pulses.

These magnetic marks provided along the circumference of the disc 14 are scanned by the magnetic head 16 and as a result supply, according to the invention, a periodic complete television synchronization signal 17 which is absolutely constant, since, in fact, also the number of revolutions of the disc 14 is constant.

The television synchronization signal obtained in this manner may be used for various purposes. An important use is, as is shown in the drawing, the synchronization of a free-running camera 18 namely in such a manner that on the one hand the camera itself is synchronized and on the other hand the synchronization signal also is superimposed upon the camera signal so that the output signal 19 of the camera forms a complete television signal. This television signal is then applied through means not shown, for example, through slip rings, to the rotating magnetic heads 2 and 3 of the recording apparatus. In the present case the recording apparatus thus synchronizes the television camera and not conversely, namely both with respect to the line fly-back and to the frame fly-back. In this manner, a pulse center for such a camera may be saved. Of course, it is not absolutely necessary that the synchronization signal is also superimposed upon the video signal supplied by the camera which is synchronization signal. It is also possible to supply the synchronization signal to the television receiver only during reproduction.

As shown in the drawing, the reference signal for the servo system 10 may also be derived from the synchronization signal obtained by means of the head 16. The servo system ensures the driving of the head disc 4 and the disc 14, since this signal in fact reflects the instantaneous condition of the control system. For many servo systems it will be of advantage to use in known manner only the frame synchronization pulses of the complete synchronization signal for the reference signal. The input for the reference signal is denoted 20 in the servo system 10. For the servo system 10 a separate generator for the reference signal may be saved in this manner such as is shown for the servo system 11, for example, by a Nipkow-disc 21, a light source 22 and a photosensitive element 23.

However, as is often desired, the synchronization signal may also be recorded, by means of a separate magnetic head 24, in a separate track on the record carrier 1 and thus serve to synchronize the apparatus during reproduction.

It has already been described in the preamble how the marks can be provided on the disc with the required accuracy. It is pointed out that this can be effected either on the finished apparatus itself, or by means of a special apparatus on each individual disc.

The head disc 4 and the disc 14 are preferably united to a structural assembly by providing the magnetizable layer 15 directly on the head disc 4. Naturally it is not absolutely necessary that the magnetizable layer 15 be provided on the circumference of the disc but the layer may naturally be formed on a side face thereof in the form of a flat ring.

When a different recording system is used, for example, with four magnetic heads arranged on the rotating member, during each revolution of the rotating member on the record carrier one frame and two complete images are recorded in total in four tracks extending obliquely on the said carrier. In an analogous manner the line and frame synchronization pulses of two complete images (four frames) must be impressed in the form of magnetic marks on the circumference of the disc bearing the marks.

In a system using only one magnetic head on the rotating member only one frame is recorded during one rotation of the member in a track extending obliquely over the record carrier. In this system twice as many line and frame synchronization pulses are recorded on the circumference of the discs bearing the marks as correspond to one frame. As is known, a frame, according to the European standard, has 312.5 lines. Therefore, first 312.5 line marks of the first frame are provided on the whole circumference of the disc. Then half the interlacing of the marks of the second frame are added in the open places between the marks of the first frame so that in total, double the number of line marks of one frame are impressed upon the circumference. During the scanning of such a number of marks, the synchronization pulses used occur with a frequency which is twice the line frequency. When a television receiver is synchronized with this synchronization signal, this is not disturbing since the synchronization device of the receiver does not react to the double line frequency. In a simple manner, however, a normal synchronization signal can again be obtained when the synchronization signal with the double line frequency is applied to a frequency divider with a dividing ratio 2:1. Analogous considerations naturally hold for a system, with, for example, three heads on the rotating member. The provision of the double marks is effected automatically with the method described in the preamble as soon as the rotating member rotates with the required number of revolutions.

While an embodiment of the invention is shown and described in detail for the purpose of illustration, it is to be expressly understood that the invention is not limited thereto. Various changes may also be made in the design and arrangement of the parts without departing from the spirit and scope of the invention as will be understood by those skilled in the art.

The rotating member provided with marks may, for example, form part of the record carried drive mechanism.

What is claimed is:

1. Apparatus for producing on a magnetic tape an image signal comprising a video component and line and frame synchronizing signals of standardized frequency, comprising rotatable video signal scanning means in cooperative relationship with said tape, a rotatable member, motor means connected to said means for rotating said member, means for synchronizing the rotation of said member and said scanning means, a magnetizable layer on said rotatable member, said layer having magnetic marks corresponding to the line and frame synchronizing signals at said standarized frequency, and a magnetic head adjacent the magnetic layer for interrogating said layer in response to rotation of said member, thereby producing said line and frame synchronizing signals.

2. An apparatus as claimed in claim 1 in which the time required by the rotating member to perform one revolution corresponds to a frame period or an odd multiple of a frame period, wherein the number of line and frame synchronization pulses which are impressed in the magnetizable layer in the form of magnetic marks is twice as large as the number of frame periods which occur during one revolution of the rotating member.

3. An apparatus as claimed in claim 1 further comprising a frequency divider having a dividing ratio of 2:1, and means for connecting said divider to the output of the magnetic head which interrogates the magnetic layer in which the marks are impressed.

4. An apparatus as claimed in claim 1 wherein said rotatable video signal scanning means comprises a rotatable disc, and magnetic heads on said disc, said apparatus further including means intermediate said member and said disc for rigidly affixing said disc to said member.

5. An apparatus as claimed in claim 1 wherein the means for synchronizing the rotation of the rotatable member and said scanning means comprises a servo system connected to said motor means, and means intermediate said interrogating magnetic head and said servo system for regulating said servo system in response to said line and frame synchronization signals from said interrogating head.

6. A method of recording marks corresponding to pulses from a pulse source on a member rotating at a desired speed, which comprises recording marks corresponding to said pulses on said member when said member is rotating at a speed departing from said desired speed, interrogating said member to detect said recorded marks, comparing said detected marks with the pulses from said pulse source to produce a first control quantity, adjusting the speed of said member in accordance with said control quantity, recording further marks corresponding to said pulses on said member when said member is rotating at said adjusted speed, interrogating said member to detect said further recorded marks, comparing said detected further recorded marks with the pulses from said pulse source to produce a further control quantity, further adjusting the speed of said member in accordance with said further control quantity, recording marks corresponding to said pulses on said member when said member is rotating at said further adjusted speed, and repeating the process until said member is rotating at said desired speed.

References Cited

UNITED STATES PATENTS 3,322,892 5/1967 Yasuoka ---------- 178—6.6

ROBERT L. GRIFFIN, *Primary Examiner.*

H. W. BRITTON, *Assistant Examiner.*